United States Patent
Kabashima

(10) Patent No.: US 10,612,438 B2
(45) Date of Patent: Apr. 7, 2020

(54) EXHAUST PURIFICATION APPARATUS FOR INTERNAL COMBUSTION ENGINE

(71) Applicant: Toyota Jidosha Kabushiki Kaisha, Toyota-shi, Aichi-ken (JP)

(72) Inventor: Nobusuke Kabashima, Gotemba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 51 days.

(21) Appl. No.: 15/730,390

(22) Filed: Oct. 11, 2017

(65) Prior Publication Data

US 2018/0106172 A1    Apr. 19, 2018

(30) Foreign Application Priority Data

Oct. 14, 2016    (JP) .................... 2016-202683

(51) Int. Cl.
*F01N 3/08*    (2006.01)
*B01J 37/02*    (2006.01)
(Continued)

(52) U.S. Cl.
CPC ....... *F01N 3/0814* (2013.01); *B01D 53/9422* (2013.01); *B01J 21/04* (2013.01);
(Continued)

(58) Field of Classification Search
CPC ........ B01D 53/9422; B01D 2255/1021; B01D 2255/1023; B01D 2255/1025;
(Continued)

(56) References Cited

U.S. PATENT DOCUMENTS

| 10,010,873 B2* | 7/2018 | Aoki ................... B01D 53/9422 |
| 2003/0093992 A1* | 5/2003 | Suga ................... B01D 53/9454 |
| | | 60/285 |

(Continued)

FOREIGN PATENT DOCUMENTS

| JP | H0970538 A | 3/1997 |
| JP | H0985055 A | 3/1997 |

(Continued)

*Primary Examiner* — Brandon D Lee
(74) *Attorney, Agent, or Firm* — Dinsmore & Shohl LLP

(57) ABSTRACT

An exhaust purification apparatus for an internal combustion engine is provided with an $NO_x$ storage and reduction type catalyst in an exhaust passage. The $NO_x$ storage and reduction type catalyst comprises a base member, an upstream side coat layer arranged on the base member, and a downstream side coat layer arranged at a downstream side in the direction of exhaust flow from the upstream side coat layer. The upstream side coat layer does not include a Ce-containing oxide but includes a precious metal catalyst. The downstream side coat layer contains a Ce-containing oxide and precious metal catalyst. A length of the upstream side coat layer is a length of 5 to 62.5% of the total length of the upstream side coat layer and the downstream side coat layer, while the remaining part of the coat layer aside from the upstream side coat layer is the downstream side coat layer.

10 Claims, 6 Drawing Sheets

(51) Int. Cl.
*B01J 23/46* (2006.01)
*B01J 21/04* (2006.01)
*B01J 35/04* (2006.01)
*F01N 13/00* (2010.01)
*B01D 53/94* (2006.01)
*B01J 23/38* (2006.01)
*B01J 23/63* (2006.01)
*B01J 35/00* (2006.01)
*F01N 3/20* (2006.01)

(52) U.S. Cl.
CPC ............. *B01J 23/38* (2013.01); *B01J 23/464* (2013.01); *B01J 23/63* (2013.01); *B01J 35/0006* (2013.01); *B01J 35/04* (2013.01); *B01J 37/0215* (2013.01); *B01J 37/0244* (2013.01); *B01J 37/0248* (2013.01); *F01N 3/0842* (2013.01); *F01N 3/2066* (2013.01); *F01N 13/009* (2014.06); *B01D 53/9477* (2013.01); *B01D 2255/1021* (2013.01); *B01D 2255/1023* (2013.01); *B01D 2255/1025* (2013.01); *B01D 2255/202* (2013.01); *B01D 2255/2042* (2013.01); *B01D 2255/2065* (2013.01); *B01D 2255/40* (2013.01); *B01D 2255/707* (2013.01); *B01D 2255/9032* (2013.01); *B01D 2255/91* (2013.01); *B01D 2255/9202* (2013.01); *B01D 2258/012* (2013.01); *F01N 2510/068* (2013.01); *F01N 2510/0682* (2013.01); *Y02T 10/24* (2013.01)

(58) Field of Classification Search
CPC ...... B01D 2255/202; B01D 2255/2042; B01D 2255/2065; B01D 2255/40; B01D 2255/707; B01D 2255/9032; B01D 2255/91; B01D 2255/9202; B01D 2258/012; B01D 53/9477; B01J 23/38; B01J 23/63; B01J 35/0006; F01N 13/009; F01N 3/0814; F01N 3/0842; F01N 3/2066; F01N 2510/068; F01N 2510/0682; Y02T 10/24
See application file for complete search history.

(56) References Cited

U.S. PATENT DOCUMENTS

| | | | |
|---|---|---|---|
| 2011/0120099 A1* | 5/2011 | Pant | B01D 53/9422 60/287 |
| 2015/0375205 A1 | 12/2015 | Umeno et al. | |
| 2015/0375206 A1 | 12/2015 | Aoki | |

FOREIGN PATENT DOCUMENTS

| | | | |
|---|---|---|---|
| JP | 2004-74138 A | 3/2004 | |
| JP | 2014-151306 A | 8/2014 | |
| WO | 2014/123232 A1 | 8/2014 | |
| WO | WO-2014125734 A1 * | 8/2014 | ......... B01D 53/9422 |

* cited by examiner

FIG. 5
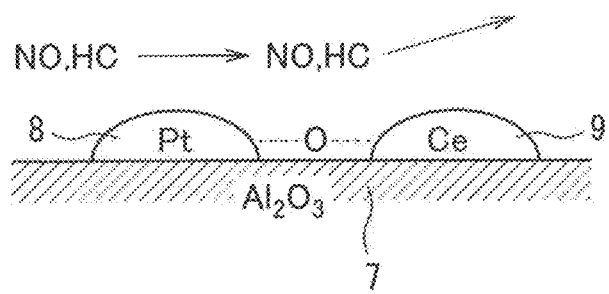
FIG. 6A
FIG. 6B
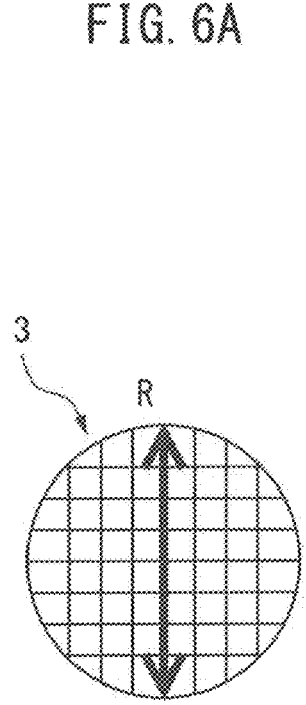
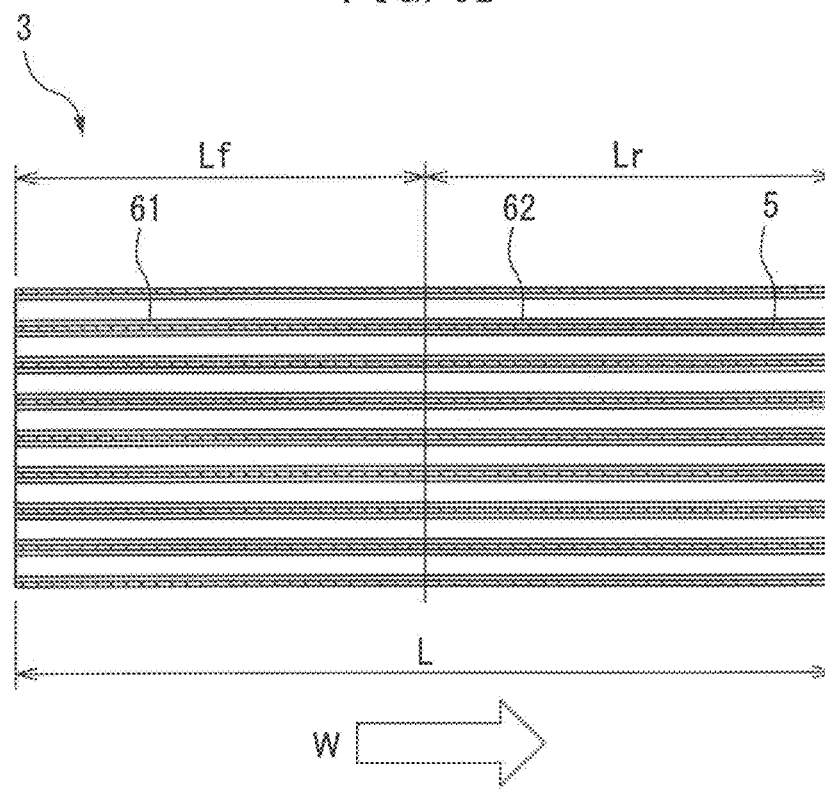
FIG. 7
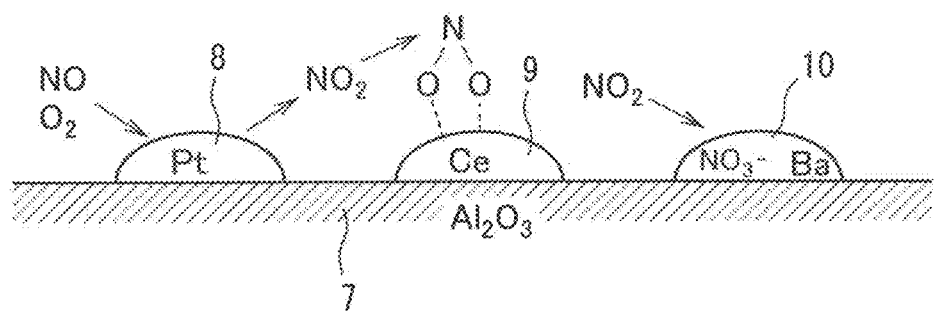

FIG. 8

| | | Lf/(Lf+Lr) (%) | Lr/(Lf+Lr) (%) | Ce content with respect to Comp. Ex.1(%) | Ce containing coat |
|---|---|---|---|---|---|
| Ex.1 | e1 | 5 | 95 | 95 | Only downstream |
| Ex.2 | e2 | 10 | 90 | 90 | Only downstream |
| Ex.3 | e3 | 12.5 | 87.5 | 87.5 | Only downstream |
| Ex.4 | e4 | 25 | 75 | 75 | Only downstream |
| Ex.5 | e5 | 37.5 | 62.5 | 62.5 | Only downstream |
| Ex.6 | e6 | 50 | 50 | 50 | Only downstream |
| Ex.7 | e7 | 62.5 | 37.5 | 37.5 | Only downstream |
| Ref.Ex.1 | r1 | 75 | 25 | 25 | Only downstream |
| Ref.Ex.2 | r2 | 87.5 | 12.5 | 12.5 | Only downstream |
| Comp.Ex.1 | c1 | - | - | 100 | Uniform |
| Comp.Ex.2 | c2 | - | - | 75 | Uniform |
| Comp.Ex.3 | c3 | - | - | 50 | Uniform |
| Comp.Ex.4 | c4 | - | - | 25 | Uniform |
| Comp.Ex.5 | c5 | - | - | 0 | Uniform |

EXHAUST PURIFICATION APPARATUS FOR INTERNAL COMBUSTION ENGINE

CROSS-REFERENCE TO RELATED APPLICATION

This application claims priority based on Japanese Patent Application No. 2016-202683 filed with the Japan Patent Office on Oct. 14, 2016, the entire contents of which are incorporated into the present specification by reference.

TECHNICAL FIELD

The present disclosure relates to an exhaust purification apparatus for an internal combustion engine.

BACKGROUND ART

Known in the art is an internal combustion engine provided with an $NO_x$ storage and reduction type catalyst storing nitrogen oxides ($NO_x$) in exhaust gas when an air-fuel ratio of an exhaust is lean and releasing and reducing the stored $NO_x$ when the air-fuel ratio of the exhaust is made rich.

WO2014/123232A discloses as such an $NO_x$ storage and reduction type catalyst an $NO_x$ storage and reduction type catalyst provided with a base member formed with a coat layer on its surface. The coat layer contains a precious metal carried on a support and ceria or a complex oxide of cerium (Ce) and strontium (St) or other Ce-containing oxide. In this $NO_x$ storage and reduction type catalyst, when the air-fuel ratio of the exhaust is lean, the $NO_x$ in the exhaust is adsorbed at the Ce-containing oxide, while when the exhaust air-fuel ratio is made rich, the adsorbed $NO_x$ is discharged from the Ce-containing oxide and reduced.

SUMMARY OF THE DISCLOSURE

In this regard, in recent years, there has been a demand for reducing the size and lightening the weight of vehicles designed for improved fuel economy by using a single catalyst to remove the harmful substances contained in the exhaust of $NO_x$ and hydrocarbons (HC). Further, $NO_x$ and HC both have similar detrimental effects on the environment, so it is desirable to reduce the total amount of the amount of exhaust of $NO_x$ and the amount of exhaust of HC.

On the other hand, since the above-mentioned $NO_x$ storage and reduction type catalyst contains a precious metal, the precious metal enables the HC to be oxidized and removed. However, Ce causes a drop in the reactivity of the precious metal, so if increasing the Ce-containing oxide, the amount of adsorption of $NO_x$ increases, but the amount of removal of HC falls. Therefore, in the above-mentioned such $NO_x$ storage and reduction type catalyst, there was the problem that it was difficult to use a single $NO_x$ storage and reduction type catalyst to make the total amount of the amount of adsorption of $NO_x$ and the amount of removal of HC increase.

To solve the above problem, an exhaust purification apparatus for the internal combustion engine according to one aspect of the present disclosure is provided with an $NO_x$ storage and reduction type catalyst in an exhaust passage. The $NO_x$ storage and reduction type catalyst comprises a base member extending in a direction of exhaust flow and a coat layer formed on the base member. The coat layer comprises an upstream side coat layer arranged at an upstream side in the direction of exhaust flow and a downstream side coat layer arranged at a downstream side in the direction of exhaust flow from the upstream side coat layer. The upstream side coat layer does not include a Ce-containing oxide but includes a precious metal catalyst. The downstream side coat layer contains a Ce-containing oxide and precious metal catalyst. A length of the upstream side coat layer is a length of 5 to 62.5% of the total length of the upstream side coat layer and the downstream side coat layer and the remaining part of the coat layer aside from the upstream side coat layer is the downstream side coat layer.

According to the exhaust purification apparatus for the internal combustion engine according to such an aspect of the present disclosure, the drop in the HC oxidation action of the precious metal catalyst at the upstream side coat layer is suppressed by elimination of Ce from the upstream side coat layer. On the other hand, the length of the remaining part of the coat layer besides the upstream side coat layer, that is, the length of the downstream side coat layer, is a sufficient length of 37.5 to 95% with respect of the total length of the upstream side coat layer and the downstream side coat layer, so it is possible to sufficiently adsorb the $NO_2$ by the Ce in the downstream side coat layer. As a result, it is possible to use a single $NO_x$ storage and reduction type catalyst to make the total amount of the $NO_x$ storage amount and HC removal amount increase.

BRIEF DESCRIPTION OF DRAWINGS

FIG. 5 is a view diagrammatically showing an action of reducing activity of a precious metal by a Ce-containing oxide.

FIG. 6A is a front view of an $NO_x$ storage and reduction type catalyst according to a working example of the present disclosure.

FIG. 6B is a cross-sectional view of an $NO_x$ storage and reduction type catalyst according to examples of the present disclosure.

FIG. 7 is a view diagrammatically showing an $NO_x$ storage action.

FIG. 8 is a table showing contents of Ce etc. for Examples 1 to 7, Reference Examples 1 and 2, and Comparative Examples 1 to 5.

DESCRIPTION OF EMBODIMENTS

Figure 1:
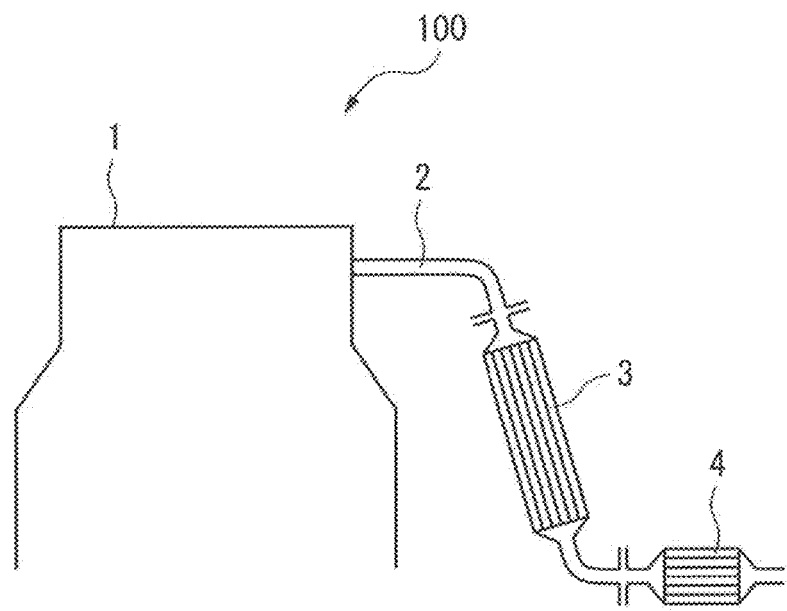
FIG. 1 is a schematic system view showing an exhaust purification apparatus for an internal combustion engine according to the present disclosure.

FIG. 1 is a schematic system view showing an exhaust purification apparatus for an internal combustion engine 100 according to the present disclosure.

The internal combustion engine 100 is provided with a diesel engine 1, an exhaust manifold 2, an $NO_x$ storage and reduction type catalyst (NSR) 3 connected to the exhaust manifold 2, and a selective reduction type catalyst (SCR) 4. Exhaust discharged from the diesel engine 1 is successively supplied through the exhaust manifold 2 to the $NO_x$ storage and reduction type catalyst 3 and selective reduction type catalyst 4. In this way, the exhaust purification apparatus for the internal combustion engine 100 according to the present embodiment is provided with the $NO_x$ storage and reduction type catalyst 3 in an exhaust passage.

Figure 2A:
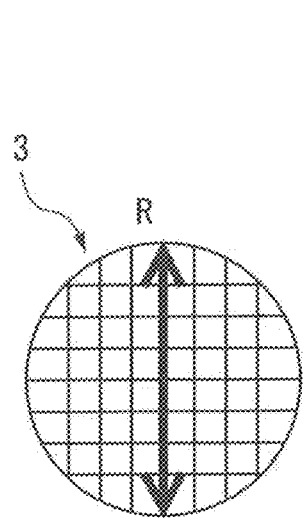
FIG. 2A is a front view of an $NO_x$ storage and reduction type catalyst.

Next, while referring to FIGS. 2A and 2B, a structure of the $NO_x$ storage and reduction type catalyst 3 will be explained. FIG. 2A is a front view of the $NO_x$ storage and reduction type catalyst 3 seen from the exhaust inflow end, while FIG. 2B is a side cross-sectional view of the $NO_x$ storage and reduction type catalyst 3 cut along the direction of exhaust passage.

Figure 2B:
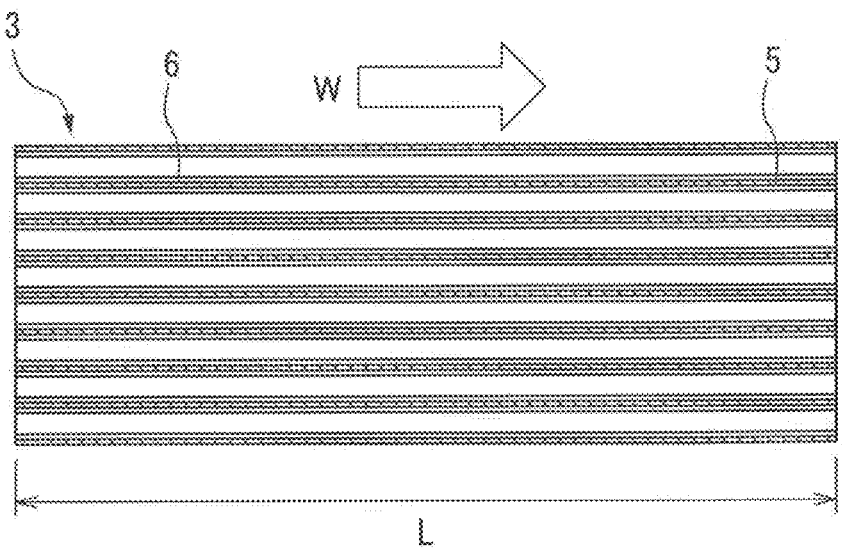
FIG. 2B is a cross-sectional view of an $NO_x$ storage and reduction type catalyst.

The $NO_x$ storage and reduction type catalyst 3 forms a cylindrical shape having a uniform cross-section over its entire length and extending in a direction of exhaust flow (direction of arrow W in FIG. 2B). The inside of the $NO_x$ storage and reduction type catalyst 3 is formed with a plurality of exhaust flow paths surrounded by partition walls. These exhaust flow paths are formed to be rectangular in cross-sections and to extend straight while maintaining certain widths. The base member 5 forming these exhaust flow paths is made of ceramic, for example, is formed from cordierite, mullite, or α-alumina. In some embodiments, the base member 5 is formed from cordierite. Furthermore, the surfaces of the partition walls are formed with a coat layer 6.

Figure 3:
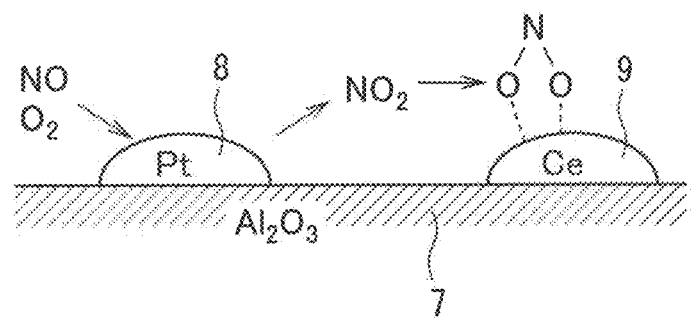
FIG. 3 is a view diagrammatically showing an $NO_x$ adsorption action of a Ce-containing oxide at the base member surface.

FIG. 3 is a view diagrammatically showing the surface of a catalyst support 7 contained in part of the coat layer 6 formed on the partition walls of the $NO_x$ storage and reduction type catalyst 3. As shown in FIG. 3, for example, a precious metal catalyst 8 and a Ce-containing oxide 9 for adsorption of $NO_x$ are carried on a catalyst support 7 comprised of alumina ($Al_2O_3$).

The precious metal catalyst 8 has an action of oxidizing NO to produce $NO_2$ and the action of reducing the $NO_x$. This precious metal catalyst 8 is comprised of at least one precious metal of platinum (Pt), palladium (Pd), and rhodium (Rh).

As the Ce-containing oxide 9, at least one of ceria and a complex oxide of Ce and strontium (St) is used. In some embodiments, ceria is the Ce-containing oxide 9. This Ce-containing oxide 9 has an excellent $NO_x$ adsorption ability in an environment of a relatively low temperature (less than 300° C.)

Figure 4:
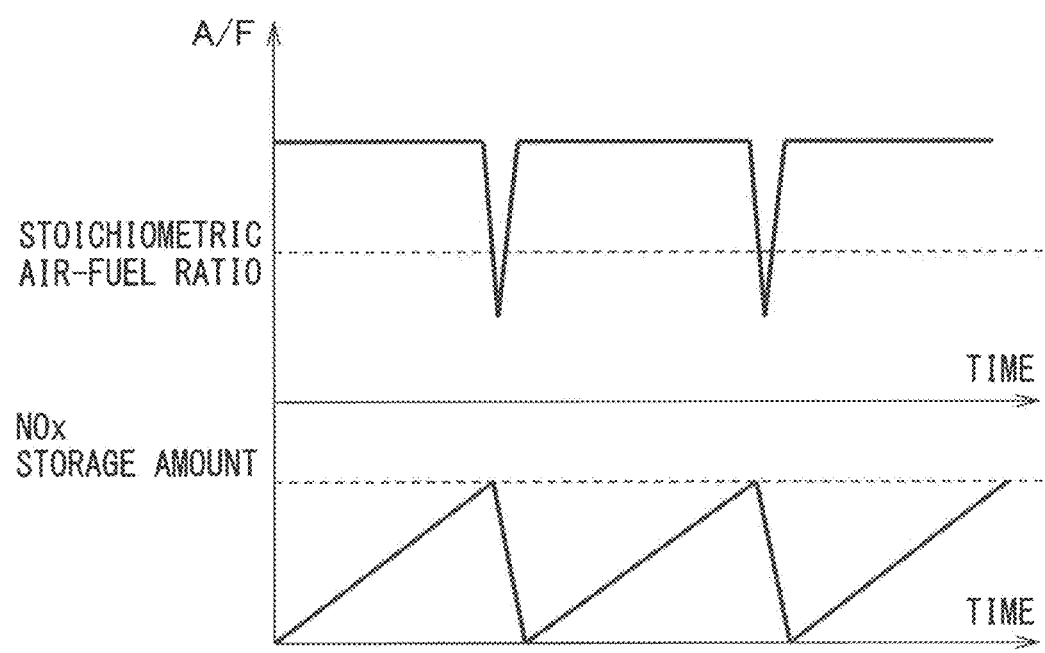
FIG. 4 is a view diagrammatically showing a change along with time of an air-fuel ratio (A/F) of exhaust and a change along with time of an amount of $NO_x$ stored in an $NO_x$ storage and reduction type catalyst.

Next, while referring to FIG. 3 and FIG. 4, the action of removal of $NO_x$ at the $NO_x$ storage and reduction type catalyst 3 will be explained in brief. FIG. 4 is a graph showing a change in time of the air-flow ratio (A/F) of the exhaust flowing into the $NO_x$ storage and reduction type catalyst 3 and an amount of $NO_x$ stored in the $NO_x$ storage and reduction type catalyst 3 ($NO_x$ storage amount).

As will be understood from FIG. 4, the air-flow ratio of the exhaust flowing into the $NO_x$ storage and reduction type catalyst 3 is usually maintained lean, so the exhaust flowing into the $NO_x$ storage and reduction type catalyst 3 is usually in an state of oxygen excess. At this time, part of the NO contained in the exhaust is oxidized at the surface of the precious metal catalyst 8 and becomes $NO_2$. Next, this $NO_2$ is believed to be adsorbed at the Ce-containing oxide 9 by the O forming the $NO_2$ and the Ce forming the Ce-containing oxide 9 chemically bonding.

In this regard, this $NO_2$ is adsorbed at the Ce-containing oxide 9 while the temperature of the exhaust flowing into the $NO_x$ storage and reduction type catalyst 3 is a relatively low temperature (less than about 300° C.) On the other hand, if the temperature of the exhaust flowing into the $NO_x$ storage and reduction type catalyst 3 becomes a relatively high temperature (about 300° C. or more), the thermal motion of $NO_2$ becomes larger and the $NO_2$ is released from the Ce-containing oxide 9. Note that, NO, which has a smaller number of O than $NO_2$, is not adsorbed at the Ce-containing oxide 9 much at all. That is, $NO_2$ is adsorbed at the Ce-containing oxide 9 when the air-flow ratio of the exhaust flowing into the $NO_x$ storage and reduction type catalyst 3 is lean and the temperature of the $NO_x$ storage and reduction type catalyst 3 is a relatively low temperature.

On the other hand, when the $NO_2$ is adsorbed at the Ce-containing oxide 9, as shown in FIG. 4, if the air-flow ratio of the exhaust flowing into the $NO_x$ storage and reduction type catalyst 3 is made rich, an oxygen concentration in the exhaust falls. At this time, the chemical bonds of Ce and O are cut and the $NO_2$ adsorbed at the Ce-containing oxide 9 is released. Next, the released $NO_2$ is reduced on the precious metal catalyst 8 by the HC and CO contained in the exhaust.

Now then, as shown in FIG. 3, the catalyst support 7 carries the Ce-containing oxide 9 and precious metal catalyst 8. When the air-fuel ratio of the exhaust is lean, the HC contained in the exhaust reacts with oxygen on the surface of the precious metal catalyst 8 and is oxidized. On the other hand, as shown in FIG. 4, if the air-fuel ratio of the exhaust is made rich, the HC reacts with the $NO_2$ adsorbed on the surface of the precious metal catalyst 8 and the $NO_2$ is reduced by the same.

In this way, NO is oxidized to $NO_2$ by the precious metal catalyst 8 and the oxidized $NO_2$ is adsorbed at the Ce-containing oxide 9. However, in this case, if the precious metal catalyst 8 and the Ce-containing oxide 9 are positioned close to each other, the HC oxidation ability of the precious metal catalyst 8 ends up being suppressed. The reason is presumed to be as follows:

That is, if the surface of the precious metal catalyst 8 is covered by oxygen atoms or oxygen molecules, the precious metal catalyst 8 falls in activity. This phenomenon is called "oxygen poisoning" and is widely known. Now, as shown in FIG. 5, if Ce and the precious metal catalyst 8 are positioned close to each other, the Ce and precious metal catalyst 8 will chemically bond through the oxygen. As a result, the precious metal catalyst 8 will enter a state of oxygen poisoning. Due to this, the precious metal catalyst 8 is reduced in oxidation ability. Therefore, if the Ce-containing oxide 9 and precious metal catalyst 8 are carried on the catalyst support 7 over the entire $NO_x$ storage and reduction type catalyst 3, the HC oxidation ability of the precious metal catalyst 8 is suppressed, so the HC removal amount is decreased and it becomes difficult to raise the total amount of the $NO_x$ adsorption amount and HC removal amount.

Therefore, in the examples of the present disclosure, as shown in FIG. 6A and FIG. 6B, the coat layer 6 is divided into an upstream side coat layer 61 arranged at the upstream side in the direction of exhaust flow and a downstream side coat layer 62 arranged at the downstream side in the direction of exhaust flow. Further, the upstream side coat layer 61 is configured so as to contain the precious metal catalyst 8, but not contain the Ce-containing oxide 9, while the downstream side coat layer 62 is configured to contain the precious metal catalyst 8 and the Ce-containing oxide 9.

By doing this, at the upstream side coat layer 61, the precious metal catalyst 8 and the Ce-containing oxide 9 are not copresent, so the activity of the precious metal catalyst 8 is never reduced by the Ce-containing oxide 9 and the activity of the precious metal catalyst 8 is maintained. As a result, the HC removal amount by the precious metal catalyst 8 increases.

Now then, if the activity of the precious metal catalyst 8 at the upstream side coat layer 61 is maintained in this way, NO is oxidized well to $NO_2$ at the upstream side coat layer 61. On the other hand, at this time, the HC removal amount increases, so the amount of HC contacting the generated $NO_2$ and the $NO_2$ in the exhaust decreases. As a result, the amount of $NO_2$ reduced to NO by HC decreases, therefore, the exhaust flowing over the downstream side coat layer 62 is raised in $NO_2$ concentration. Furthermore, if the HC removal amount of the upstream side coat layer 61 increases, the amount of HC flowing over the downstream side coat layer 62 decreases, so the NO in the exhaust is oxidized to $NO_2$ on the precious metal catalyst 8 of the downstream side coat layer 62 as well and, therefore, the exhaust flowing over the downstream side coat layer 62 is sufficiently raised in $NO_2$ concentration. Due to the $NO_2$ concentration at the downstream side coat layer 62 being raised in this way, the opportunities for the Ce-containing oxide 9 and $NO_2$ to chemically bond increase and a greater amount of $NO_2$ is adsorbed at the Ce-containing oxide 9.

Therefore, by forming the upstream side coat layer 61 and the downstream side coat layer 62 so that the upstream side coat layer 61 contains the precious metal catalyst 8 but does not contain the Ce-containing oxide 9 and the downstream side coat layer 62 contains the precious metal catalyst 8 and Ce-containing oxide 9, it is possible to make the HC removal amount at the upstream side coat layer 61 increase and make the $NO_x$ adsorption amount at the downstream side coat layer 62 increase. As a result, it becomes possible to make the total value of the $NO_x$ adsorption amount and HC removal amount increase.

On the other hand, in order for the coat layer 6 to further absorb $NO_x$, it may be made to further contain one or both of an alkali metal and alkali earth metal. In this case, as the alkali metal, potassium (K), rubidium (Rb), cesium (Cs), etc. may be mentioned. As the alkali earth metal, calcium (Ca), strontium (St), barium (Ba), etc. may be mentioned. These alkali metals and alkali earth metals have excellent $NO_x$ absorbing abilities in an environment of a relatively high temperature (300° C. or more). Below, alkali metals and alkali earth metals absorbing $NO_x$ will be referred to as "$NO_x$ absorbing metals 10".

Next, the action of absorption of $NO_x$ when using Ba as such an $NO_x$ absorbing metal 10 will be explained. FIG. 7 is a view diagrammatically showing the $NO_x$ absorbing action of an $NO_x$ absorbing metal.

As shown in FIG. 7, when the air-flow ratio of the exhaust flowing into the $NO_x$ storage and reduction type catalyst 3 is lean, $NO_2$ is further oxidized on the surface of the precious metal catalyst 8 and becomes nitric acid ions ($NO_3^-$) which then react with the $NO_x$ absorbing metal 10 and are absorbed in the form of a nitrate. On the other hand, when the air-flow ratio of the exhaust flowing into the $NO_x$ storage and reduction type catalyst 3 is made rich, the concentration of oxygen in the exhaust falls, so the reaction proceeds in the opposite direction and the $NO_3^-$ which had been absorbed as nitrates is again discharged as $NO_2$. Next, the discharged $NO_2$ is reduced by the HC and CO contained in the exhaust.

In this way, there are two actions on $NO_x$: the action of adsorption of $NO_x$ by the Ce-containing oxide 9 and the action of absorption of $NO_x$ by the $NO_x$ absorbing metal 10. These two actions will be combined and called "storage".

Note that, the action of absorption of $NO_x$ by Ba is stronger in force holding the $NO_x$ compared with the adsorption action and has a harder time releasing $NO_2$. For this reason, an $NO_x$ storage and reduction type catalyst 3 containing both of an $NO_x$ absorbing metal 10 and Ce-containing oxide 9 has an excellent $NO_x$ storing ability with respect to a broad temperature region of the exhaust.

Note that, in the examples according to the present disclosure, as shown in FIG. 1, to reduce the size of the exhaust system and promote warmup of the $NO_x$ storage and reduction type catalyst 3, the $NO_x$ storage and reduction type catalyst 3 is directly connected to the exhaust manifold 2. An oxidation catalyst for oxidizing the HC is not arranged between the exhaust manifold 2 and the $NO_x$ storage and reduction type catalyst 3. However, in the examples according to the present disclosure, in this way, even if the oxidation catalyst is not arranged upstream of the $NO_x$ storage and reduction type catalyst 3, since the upstream side coat layer 61 of the $NO_x$ storage and reduction type catalyst 3 has a powerful oxidation function, at the time of the engine warmup operation, a large amount of heat of oxidation reaction is generated at the upstream side coat layer 61. As a result, the $NO_x$ storage and reduction type catalyst 3 can be warmed up earlier.

Next, the method of production of Example 1 of the $NO_x$ storage and reduction type catalyst 3 according to the present disclosure will be explained. First, to start, a slurry A for forming the upstream side coat layer 61 will be explained. First, a palladium nitrate solution, platinum dinitrodiammine solution, and rhodium nitrate solution were impregnated in alumina ($Al_2O_3$) to prepare a precious metal-carrying powder in which Pd: 0.6 wt %, Pt: 3.5 wt %, and Rh: 0.2 wt % are carried on alumina. This precious metal-carrying powder and water, an alumina binder, and a thickener were mixed to prepare the slurry A. This slurry A had an amount of precious metal-carrying powder per liter of 100 g/liter.

Next, a slurry B for forming the downstream side coat layer 62 will be explained. First, in the same way as the upstream side coat layer 61, a precious metal-carrying powder was prepared. This precious metal-carrying powder and ceria ($CeO_2$), water, an alumina binder, and a thickener were mixed to prepare the slurry B. This slurry B had an amount of precious metal-carrying powder per liter of 100 g/liter. The amount of ceria was 200 g/liter.

Next, the slurry A and slurry B were coated on a base member 5. The upstream side part of this base member 5 in the direction of exhaust flow was immersed in the slurry A and the slurry A was sucked off from the downstream side end in the direction of exhaust flow to thereby coat the slurry A for forming the upstream side coat layer 61 on the partition walls of the base member 5. Next, the downstream side part of the base member 5 in the direction of exhaust flow was immersed in the slurry B and the slurry B was sucked off from the upstream side end in the direction of exhaust flow to thereby coat the slurry B on the region in which the slurry A was not coated in the partition walls of the base member 5.

In the examples according to the present disclosure, the slurry A and slurry B were coated so that the length of the total of the length Lf of the region in which the slurry A was coated and the length Lr of the region in which the slurry B was coated became the length L of the base member 5 in the direction of exhaust flow. In Example 1, the length Lf of the region in which the slurry A was coated was 5% with respect to the length L of the base member 5 in the direction of exhaust flow and the length Lr of the region in which the slurry B was coated was 95%. Note that, the volume of the base member 5 in this Example 1 was 2 liters, the length L in the direction of exhaust flow was 390 mm, and the diameter R of the cross-section of the base member 5 was 129 mm.

Next, the base member 5 was made to dry, then was impregnated with barium acetate. It was made to further dry, then was fired to make the partition walls sectioning the base member 5 carry barium Ba. In this example, the amount of barium Ba supported was 0.1 mol/liter. Due to the above process, the region in which the slurry A was coated became the upstream side coat layer 61, the region in which the slurry B was coated became the downstream side coat layer 62, and the $NO_x$ storage and reduction type catalyst 3 of Example 1 was obtained.

Next, the methods of production of Examples 2 to 7 and Reference Examples 1 and 2 of the $NO_x$ storage and reduction type catalyst according to present disclosure will be explained. Examples 2 to 7 and Reference Examples 1 and 2 and Example 1 differ in only the length of the region where the slurry A was coated, that is, the length Lf of the upstream side coat layer 61, and the length of the region where the slurry B was coated, that is, the length Lr of the downstream side coat layer 62. The methods of production were the same. Therefore, the explanation of the methods of production will be omitted.

The table shown in FIG. 8 shows the ratios of the length Lf of the upstream side coat layer 61 and the length Lr of the downstream side coat layer 62 to the sum of the length Lf of the upstream side coat layer 61 and the length Lr of the downstream side coat layer 62 of Examples 1 to 7 and Reference Examples 1 and 2. In Examples 1 to 7 and Reference Examples 1 and 2, the concentrations of Ce in the slurry B for forming the downstream side coat layer 62 are made the same, so the length Lr of the downstream side coat layer 62 and the amount of Ce contained in the $NO_x$ storage and reduction type catalyst are proportional.

As explained above, in Examples 1 to 7, the upstream side coat layer 61 and the downstream side coat layer 62 respectively contain Pt, Pd, and Rh as the precious metal catalyst 8. Furthermore, the upstream side coat layer 61 and the downstream side coat layer 62 contain Ba, one of the alkali earth metals. Further, the downstream side coat layer 62 contains the Ce-containing oxide 9.

Next, the method of production of Comparative Example 1 will be explained. Comparative Example 1 coats the slurry B with a composition the same as Example 1 on the partition walls over the entire region of the base member and therefore makes the Ce-containing oxide 9 be carried over the entire region of the base member. Other than this, the method is similar to Example 1, so the explanation will be omitted.

Finally, the methods of production of Comparative Examples 2 to 5 will be explained. Comparative Examples 2 to 4 and Comparative Example 1 differ only on the point of the difference in the concentration of the Ce-containing oxide 9 of the slurry B. On the rest of the points, Comparative Examples 2 to 4 are the same as Comparative Example 1.

That is, in each of Comparative Examples 2 to 4, the slurry B was prepared to give a content of Ce-containing oxide 9 as follows and the slurry B was coated on the partition walls over the entire region of the base member. Specifically, the slurry B was prepared so that, the content of ceria became 150 g/liter in Comparative Example 2, became 100 g/liter in Comparative Example 3, and became 50 g/liter in Comparative Example 4. In Comparative Example 5, the slurry A, that is, a slurry in which Ce is not contained, was coated on the partition walls over the entire region of the base member.

The table shown in FIG. 8 shows the contents of Ce in Comparative Examples 1 to 5. Comparative Examples 1 to 5 had coat layers formed over the entire region of the catalyst, but as explained above, the contents of the Ce contained in the slurry forming the coat layer differ, so in the comparative examples, the Ce contents differ.

Next, the tests performed for Examples 1 to 7, Reference Examples 1 and 2, and Comparative Examples 1 to 5 will be explained. That is, first, to approach the performance of an actual vehicle, each $NO_x$ storage and reduction type catalyst was arranged in the exhaust pipe of the diesel engine 1. The exhaust generated by operating the diesel engine 1 was used to hold the $NO_x$ storage and reduction type catalyst 3 as is at 750° C. for 50 hours to cause the $NO_x$ storage and reduction type catalyst 3 to degrade. After that, the diesel engine 1 was operated so that the temperature of the $NO_x$ storage and reduction type catalyst 3 became 150° C. The diesel engine 1 continued to be operated until the cumulative amount of $NO_x$ passing through the $NO_x$ storage and reduction type catalyst 3 became 500 mg. Note that, at this time, the cumulative amount of the HC passing through the $NO_x$ storage and reduction type catalyst 3 was 390 mg.

Through this test, the $NO_x$ storage rate and the HC removal rate were respectively evaluated. The $NO_x$ storage rate is calculated by subtracting the amount of $NO_x$ detected downstream of the $NO_x$ storage and reduction type catalyst 3 from the amount of $NO_x$ detected upstream of the $NO_x$ storage and reduction type catalyst 3 to thereby obtain the $NO_x$ storage amount of the $NO_x$ storage and reduction type catalyst 3, then dividing this $NO_x$ storage amount by the amount of $NO_x$ detected upstream of the $NO_x$ storage and reduction type catalyst 3.

Similarly, the HC removal rate is calculated by subtracting the amount of HC detected downstream of the $NO_x$ storage and reduction type catalyst 3 from the amount of HC detected upstream of the $NO_x$ storage and reduction type catalyst 3 to thereby obtain the HC removal amount of the $NO_x$ storage and reduction type catalyst 3, then dividing this HC removal amount by the amount of HC detected upstream of the $NO_x$ storage and reduction type catalyst 3.

Figure 9:
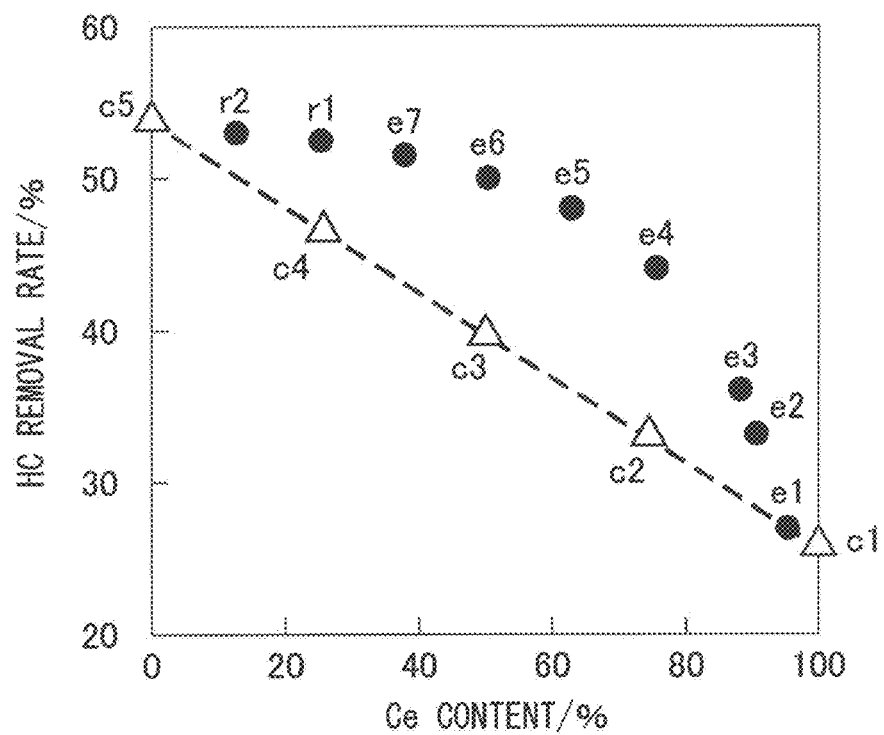
FIG. 9 is a view showing a relationship between a Ce content and HC removal rate.

FIG. 9 shows the relationship between the Ce content and HC removal rate. The points e1 to e7 of FIG. 9 correspond to Examples 1 to 7, the points r1 and r2 correspond to Reference Examples 1 and 2, and the points c1 to c5 correspond to Comparative Examples 1 to 5.

First, Examples 1 to 7 shown by points e1 to e7 and Reference Examples 1 and 2 shown by points r1 and r2 will be explained. As an overall trend, it will be understood that the HC removal rate is improved along with a drop in the Ce content. In particular, in the region of a Ce content of 75% or more (Examples 1 to 4), the removal rate of HC rapidly rises along with the decrease of the Ce content, while in the region of a Ce content of less than 75% (Examples 5 to 7 and Reference Examples 1 and 2), the removal rate of HC slowly rises along with the decrease of the Ce content. Such a phenomenon is believed to occur as follows:

That is, the slurry A coated on the upstream side coat layer 61 does not contain Ce, so the precious metal catalyst 8 contained in the upstream side coat layer 61 suppresses the drop in activity due to Ce. On the other hand, the slurry B coated on the downstream side coat layer 62 contains Ce and the precious metal catalyst 8 mixed together, so Ce is sometimes positioned near the precious metal catalyst 8. Therefore, part of the precious metal catalyst 8 falls in activity due to Ce.

Now then, the majority of the HC contained in the exhaust is oxidized within a range of 25% of the $NO_x$ storage and reduction type catalyst 3 at the upstream side in the direction of exhaust flow. Therefore, the upstream side 25% range of precious metal catalyst 8 greatly contributes to the HC removal rate. Therefore, if there is no Ce in the upstream side 25% range, the HC removal rate is greatly improved. As opposed to this, the downstream side 75% range of precious metal catalyst does not greatly contribute to the HC purification, so even if there is no Ce in the downstream side 75% range, the HC removal rate does not rise that much. For this reason, the relationship between the Ce content and HC removal rate is believed to become the relationship such as FIG. 9.

Next, Comparative Examples 1 to 5 will be explained. In Comparative Examples 1 to 5, the HC removal rate rises along with a drop in the Ce content. In this case, in Comparative Examples 1 to 5, the correlation between the Ce content and the HC removal rate can be approximated by a line (see broken line of FIG. 9). Comparing the approximation line formed by the comparative examples and Examples 1 to 7 and Reference Examples 1 and 2 corresponds to comparing the case of uniformly reducing the concentration of Ce of the $NO_x$ storage and reduction type catalyst 3 (comparative examples) and the case of successively removing Ce from the upstream side (examples and reference examples). Examples 1 to 7 and Reference Examples 1 and 2 are positioned higher than the approximation line. Therefore, it will be understood that the HC removal performance is improved by removing Ce successively from the upstream side.

Figure 10:
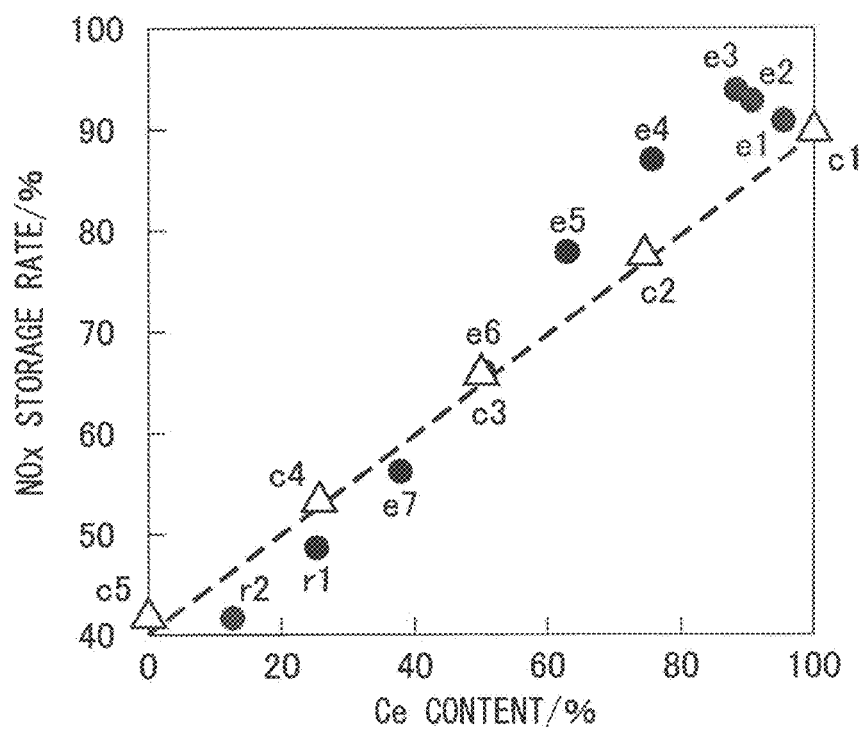
FIG. 10 is a view showing a relationship between a Ce content and an $NO_x$ storage rate.

Next, the $NO_x$ storage rate will be explained. FIG. 10 shows the relationship between the Ce content and the $NO_x$ storage rate. First, Examples 1 to 7 (points e1 to e7) and Reference Examples 1 and 2 (points r1 and r2) will be explained. Referring to FIG. 10, in the region where the Ce content is 87.5% or more (Examples 1 to 3), the $NO_x$ storage rate greatly increases along with a decrease in the Ce content. This phenomenon can be understood as follows.

That is, due to the removal of Ce at the upstream side of the $NO_x$ storage and reduction type catalyst 3, the drop in activity of the precious metal catalyst 8 at the upstream side of the $NO_x$ storage and reduction type catalyst 3 is suppressed. As a result, the oxidation of the HC by the precious metal catalyst 8 is promoted. Further, if an upstream side coat layer 61 with no Ce is formed, NO is oxidized well to $NO_2$ at the upstream side coat layer 61. On the other hand, at this time, the HC removal amount at the upstream side coat layer 61 increases, so the amount of HC which contacts the generated $NO_2$ and the $NO_2$ in the exhaust decreases. As a result, the amount of $NO_2$ reduced to NO by the HC decreases, therefore, the exhaust flowing over the downstream side coat layer 62 is raised in $NO_2$ concentration. Furthermore, if the HC removal amount of the upstream side coat layer 61 increases, the amount of HC flowing into the downstream side coat layer 62 decreases, so the NO in the exhaust is oxidized to $NO_2$ on the precious metal catalyst 8 of the downstream side coat layer 62 as well and therefore the exhaust flowing over the downstream side coat layer 62 is sufficiently raised in $NO_2$ concentration.

In this way, due to the $NO_2$ concentration at the downstream side coat layer 62 being raised, the opportunities for the Ce-containing oxide 9 and $NO_2$ to chemically bond increase and a greater amount of $NO_2$ is adsorbed at the Ce-containing oxide 9. Therefore, due to the elimination of Ce at the upstream side of the $NO_x$ storage and reduction type catalyst 3, Ce can adsorb more $NO_2$. As a result, the $NO_x$ storage rate greatly increases.

On the other hand, in the region where the Ce content is less than 87.5% (Examples 4 to 7 and Reference Examples 1 and 2), along with the reduction in the Ce content, the $NO_x$ storage rate falls. That is, if the length of the downstream side coat layer 62 becomes shorter, the opportunities for Ce to adsorb $NO_2$ decrease. As a result, the amount of $NO_2$ adsorbed by Ce decreases. Therefore, as the Ce content decreases, that is, as the length of the downstream side coat layer 62 becomes shorter, the $NO_x$ storage rate decreases.

Explained another way, in the region of a Ce content of less than 87.5%, the effect of the $NO_x$ storage rate falling due to the amount of Ce able to adsorb $NO_2$ being reduced becomes greater than the effect of increasing the amount of $NO_2$ and improving the $NO_x$ storage rate due to the drop in the activity of the precious metal catalyst being suppressed, so along with a reduction in the amount of Ce, the $NO_x$ storage rate falls.

Next, Comparative Examples 1 to 5 (c1 to c5) will be explained. In Comparative Examples 1 to 5, the $NO_x$ storage rate falls along with the reduction in the Ce content. In this case, in Comparative Examples 1 to 5, the correlation between the Ce content and HC removal rate can be approximated by an approximation line (see broken line in FIG. 9). As shown in FIG. 10, at a Ce content of 50 to 95%, the $NO_x$ storage rates of Examples 1 to 6 are higher values than the $NO_x$ storage rates of the comparative examples obtained by the approximation line. Therefore, it will be understood that the $NO_x$ storage rate is improved.

Note that, despite the Ce content being 0%, the $NO_x$ storage rate is a value close to 40%, but this is believed to be an effect of the absorption of $NO_x$ by Ba.

From FIG. 9 and FIG. 10, it will be understood that if making the length Lf of the upstream side coat layer a length of 5 to 50% with respect to the length Lf+Lr of the total of the upstream side coat layer 61 and the downstream side coat layer 62, both the removal rate of HC and the storage rate of $NO_x$ are improved.

Figure 11:
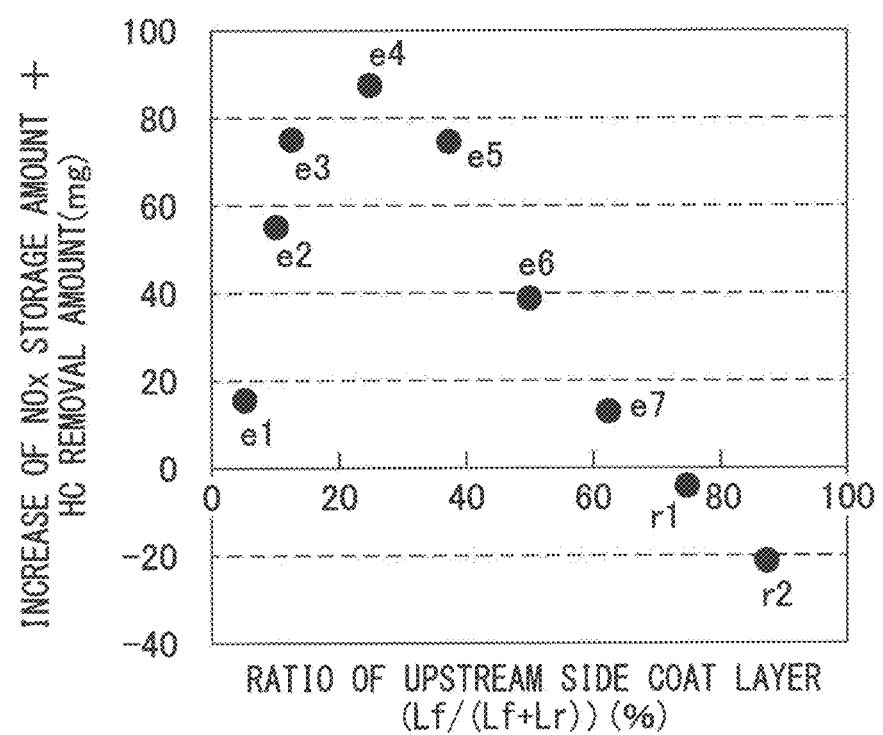
FIG. 11 is a view showing a relationship among an increase of a total amount of an $NO_x$ storage amount and HC removal amount and a ratio of an upstream side coat layer.

Finally, the results of evaluation based on the $NO_x$ storage amount and HC removal amount will be shown. First, to evaluate the effects of the Examples 1 to 7 and Reference Examples 1 and 2, comparative examples are compared with. For this reason, first, points on an approximation line of comparative examples having the same Ce contents as the working examples and reference examples are found. Next, the total amount of the $NO_x$ storage amount and the HC removal amount at the point on the approximation line corresponding to each of the working examples and reference examples is subtracted from the total amount of the $NO_x$ storage amount and HC removal amount of each of the working examples and reference examples to find the increase in the total amount of the $NO_x$ storage amount and the HC removal amount. FIG. 11 shows the relationship between the increase in the total amount of the $NO_x$ storage amount and HC removal amount obtained in this way and the ratio (Lf/(Lf+Lr)) of the length Lf of the upstream side coat layer 61 with respect to the length Lf+Lr of the total of the length Lf of the upstream side coat layer 61 and the length Lr of the downstream side coat layer 62.

In FIG. 11, the range where a positive value is taken is the range of increase of the total amount of the $NO_x$ storage amount and HC removal amount with respect to the comparative examples. That is, it will be understood that the total amount of the $NO_x$ storage amount and HC removal amount increases with respect to the comparative examples while the ratio Lf/(Lf+Lr) of the length Lf of the upstream side coat layer 61 with respect to the length Lf+Lr of the total of the length Lf of the upstream side coat layer 61 and the length Lr of the downstream side coat layer 62 is 5 to 62.5%. Therefore, in the examples according to the present disclosure, the length Lf of the upstream side coat layer 61 is made a length of 5 to 62.5% with respect to the length Lf+Lr of the total of the length Lf of the upstream side coat layer 61 and the length Lr of the downstream side coat layer 62.

That is, the $NO_x$ storage and reduction type catalyst 3 according to the present disclosure is provided with a base member 5 extending in the direction of exhaust flow and a coat layer 6 arranged on the base member 5. The coat layer 6 is provided with an upstream side coat layer 61 arranged on the upstream side in the direction of exhaust flow and a downstream side coat layer 62 arranged at the downstream side in the direction of exhaust flow from the upstream side coat layer 61. The upstream side coat layer 61 does not contain the Ce-containing oxide 9 but contains the precious metal catalyst 8, while the downstream side coat layer 62 contains the Ce-containing oxide 9 and precious metal catalyst 8. The length Lf of the upstream side coat layer 61 is a length of 5 to 62.5% with respect to the length Lf+Lr of the total of the upstream side coat layer 61 and the downstream side coat layer 62. The remaining part of the coat layer besides the upstream side coat layer 61 becomes the downstream side coat layer 62. That is, the length Lr of the downstream side coat layer 62 becomes a length of 37.5 to 95% with respect to the length Lf+Lr of the total of the upstream side coat layer 61 and the downstream side coat layer 62.

If using such an $NO_x$ storage and reduction type catalyst 3 provided with the upstream side coat layer 61 and downstream side coat layer 62, it is possible to make the total amount of the $NO_x$ storage rate and HC removal rate increase. This can be confirmed by the increase in the total amount of the $NO_x$ storage amount and HC removal amount in FIG. 11 being 0 or more. Note that, in this case, as will be understood from FIG. 11, if making the length Lf of the upstream side coat layer 61 a length of 10 to 50% with respect to the length Lf+Lr of the total of the length Lf of the upstream side coat layer 61 and the length Lr of the downstream side coat layer 62, the increase of the total amount of the $NO_x$ storage amount and the HC removal amount becomes 20 mg or more and it is possible to greatly increase the total amount of the $NO_x$ storage amount and the HC removal amount. In some embodiments, the length Lf of the upstream side coat layer 61 is made a length of 10 to 50% of the length Lf+Lr of the total of the length Lf of the upstream side coat layer 61 and the length Lr of the downstream side coat layer 62.

In this regard, in legal regulations relating to exhaust of a vehicle provided with a diesel engine 1, the total amount of the $NO_x$ exhaust amount and the HC exhaust amount is a parameter of the regulations. Therefore, by determining the length Lf of the upstream side coat layer 61 and the length Lr of the downstream side coat layer 62 so that the total amount of the $NO_x$ storage amount and the HC removal amount becomes the maximum, it becomes possible to suitably deal with the legal regulations.

Note that, the relative relationship between the $NO_x$ amount and the HC amount discharged from the diesel engine 1 changes according to the operating state of the diesel engine 1. However, for example, when the $NO_x$ exhaust amount is 500 mg, it is believed that the HC exhaust amount will only change by an extent of about 50 mg with respect to 390 mg.

In this case, even if the HC exhaust amount changes by this extent of amount with respect to the $NO_x$ exhaust amount, the total amount of the $NO_x$ adsorption amount and HC removal amount shown in FIG. 11 does not change much at all. Therefore, it can be said to be practically sufficient to determine the length Lf of the upstream side coat layer 61 and the length Lr of the downstream side coat layer based on the total amount of the $NO_x$ adsorption amount and HC removal amount shown in FIG. 11.

Note that, as a modification, separate coat layers from the upstream side coat layer 61 and the downstream side coat layer 62 can be laminated above and below the upstream side coat layer 61 and the downstream side coat layer 62. Even if using such a modification, the total amount of the $NO_x$ adsorption amount and HC removal amount have the relationship such as shown in FIG. 11.

The invention claimed is:

1. An exhaust purification apparatus for an internal combustion engine provided with an $NO_x$ storage and reduction type catalyst in an exhaust passage, wherein
the $NO_x$ storage and reduction type catalyst comprises:
a base member extending in a direction of exhaust flow; and
a coat layer formed on the base member,
the coat layer comprises:
an upstream side coat layer arranged at an upstream side in the direction of exhaust flow; and
a downstream side coat layer arranged at a downstream side in the direction of exhaust flow from the upstream side coat layer, wherein the downstream side coat layer is disposed only on a region of the base member in which the upstream side coat layer is not coated,
the upstream side coat layer does not include a Ce-containing oxide but includes a precious metal catalyst,
the downstream side coat layer contains a Ce-containing oxide and precious metal catalyst, wherein a loading of the precious metal catalyst is uniform along a total length of the upstream side coat layer and the downstream side coat layer, and
a length of the upstream side coat layer is a length of 5 to 62.5% of the total length of the upstream side coat layer and the downstream side coat layer and the remaining part of the coat layer aside from the upstream side coat layer is the downstream side coat layer.

2. The exhaust purification apparatus for the internal combustion engine according to claim 1, wherein
the length of the upstream side coat layer is a length of 10 to 50% of the total length of the upstream side coat layer and the downstream side coat layer.

3. The exhaust purification apparatus for the internal combustion engine according to claim 1, wherein
the precious metal catalyst contained in the upstream side coat layer and the precious metal catalyst contained in the downstream side coat layer respectively contain at least one precious metal among Pt, Pd, and Rh.

4. The exhaust purification apparatus for the internal combustion engine according to claim 1, wherein
the downstream side coat layer includes one or both of an alkali metal and alkali earth metal.

5. The exhaust purification apparatus according to claim 1, wherein the upstream side coat layer and the downstream side coat layer include Rh and at least one other precious metal catalyst.

6. The exhaust purification apparatus according to claim 1, wherein the upstream side coat layer and the downstream side coat layer comprise barium.

7. The exhaust purification apparatus according to claim 6, wherein an amount of barium in the upstream side coat layer is the same as an amount of barium in the downstream side coat layer.

8. The exhaust purification apparatus according to claim 1, wherein the coat layer comprises both an alkali metal and an alkali earth metal.

9. The exhaust purification apparatus according to claim 1, wherein the $NO_x$ storage and reduction type catalyst is directly connected to an exhaust manifold of the internal combustion engine.

10. The exhaust purification apparatus according to claim 9, wherein the exhaust purification apparatus does not include an oxidation catalyst arranged between the exhaust manifold and the $NO_x$ storage and reduction type catalyst.

* * * * *

UNITED STATES PATENT AND TRADEMARK OFFICE
CERTIFICATE OF CORRECTION

PATENT NO.         : 10,612,438 B2
APPLICATION NO.    : 15/730390
DATED              : April 7, 2020
INVENTOR(S)        : Nobusuke Kabashima Page 1 of 1

It is certified that error appears in the above-identified patent and that said Letters Patent is hereby corrected as shown below:

On the Title Page

Item (72), inventor city, delete "Gotemba" and insert --Gotemba-shi Shizuoka-ken--, therefor.

Signed and Sealed this
Twenty-sixth Day of May, 2020

Andrei Iancu
*Director of the United States Patent and Trademark Office*